(12) United States Patent
Khlifi

(10) Patent No.: US 10,641,892 B2
(45) Date of Patent: May 5, 2020

(54) METHOD FOR ACQUIRING TRANSVERSE-POSITION INFORMATION OF A MOTOR VEHICLE ON A CARRIAGEWAY AND MOTOR VEHICLE

(71) Applicant: AUDI AG, Ingolstadt (DE)

(72) Inventor: Rachid Khlifi, Garching (DE)

(73) Assignee: Audi AG, Ingolstadt (DE)

( * ) Notice: Subject to any disclaimer, the term of this patent is extended or adjusted under 35 U.S.C. 154(b) by 315 days.

(21) Appl. No.: 15/546,627

(22) PCT Filed: Jan. 27, 2016

(86) PCT No.: PCT/EP2016/000137
§ 371 (c)(1),
(2) Date: Jul. 26, 2017

(87) PCT Pub. No.: WO2016/124316
PCT Pub. Date: Aug. 11, 2016

(65) Prior Publication Data
US 2018/0024238 A1   Jan. 25, 2018

(30) Foreign Application Priority Data
Feb. 4, 2015   (DE) .................. 10 2015 001 386

(51) Int. Cl.
*G01S 13/931* (2020.01)
*B60W 30/12* (2020.01)
(Continued)

(52) U.S. Cl.
CPC ........... *G01S 13/931* (2013.01); *B60W 30/12* (2013.01); *G01S 7/411* (2013.01); *G01S 13/87* (2013.01);
(Continued)

(58) Field of Classification Search
CPC ...... G01S 13/931; G01S 7/411; G01S 13/867; G01S 13/87; G01S 2007/028; B60W 30/12; B60R 19/483
See application file for complete search history.

(56) References Cited

U.S. PATENT DOCUMENTS 6,526,352 B1 * 2/2003 Breed ................ G01C 21/3697
701/470
7,801,659 B2 9/2010 Leineweber et al.
(Continued)

FOREIGN PATENT DOCUMENTS

CN   101545975 A   9/2009
DE   103 45 802 A1   4/2005
(Continued)

OTHER PUBLICATIONS

Lee et al., "A Fully-Integrated 77-GHz FMCW Radar Transceiver in 65-nm CMOS Technology," *IEEE Journal of Solid-State Circuits* 45(12):2746-2756, Dec. 2010.
(Continued)

*Primary Examiner* — Vladimir Magloire
*Assistant Examiner* — Donal H B Braswell
(74) *Attorney, Agent, or Firm* — Sterne, Kessler, Goldstein & Fox P.L.L.C.

(57) ABSTRACT

Method for acquiring transverse-position information of a motor vehicle (10) on a roadway (16), wherein radar data describing at least part of the roadway (16) are acquired by at least one radar sensor (1) of the motor vehicle (10), environmental features describing the location of a roadway boundary are detected and localized in the radar data by evaluation, from these, a course of the roadway boundaries of the roadway (16) and lateral distances (24) of the motor vehicle (10) with respect to the lane boundaries are determined, and the transverse-position information is deter-
(Continued)

Figure 1:
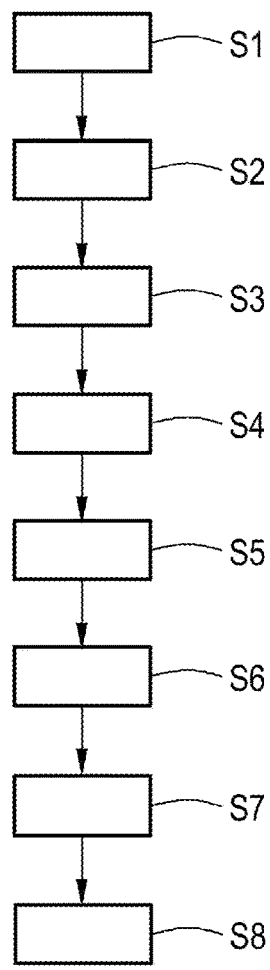

mined as, or as a function of, the lateral distances (24) of the motor vehicle (10) from the roadway boundaries.

13 Claims, 2 Drawing Sheets

(51) Int. Cl.
   *G01S 7/41* (2006.01)
   *G01S 13/87* (2006.01)
   *G01S 7/02* (2006.01)
   *B60R 19/48* (2006.01)

(52) U.S. Cl.
   CPC .................. *G01S 2007/028* (2013.01); *G06T 2207/30256* (2013.01)

(56) References Cited

U.S. PATENT DOCUMENTS

| | | | |
|---|---|---|---|
| 8,040,253 B2 | 10/2011 | Kaller et al. | |
| 8,511,164 B2 | 8/2013 | Klee et al. | |
| 8,751,157 B2 | 6/2014 | Simon | |
| 9,132,837 B2 | 9/2015 | Schlensag et al. | |
| 9,435,885 B2 * | 9/2016 | Fritsch | B62D 6/007 |
| 9,721,471 B2 * | 8/2017 | Chen | G08G 1/167 |
| 2009/0055095 A1 | 2/2009 | Urban et al. | |
| 2009/0102629 A1 | 4/2009 | Koller et al. | |
| 2013/0238192 A1 | 9/2013 | Breu | |
| 2014/0012491 A1 | 1/2014 | Akiyama et al. | |
| 2014/0111369 A1 * | 4/2014 | Oh | G01S 15/931 342/52 |
| 2014/0118182 A1 * | 5/2014 | Oh | G01S 13/867 342/52 |
| 2014/0324325 A1 | 10/2014 | Schlensag et al. | |
| 2015/0081211 A1 * | 3/2015 | Zeng | B60W 30/0956 701/446 |
| 2016/0046237 A1 * | 2/2016 | Sugimoto | B60R 1/00 348/148 |
| 2016/0245911 A1 * | 8/2016 | Wang | G01S 13/72 |
| 2017/0039835 A1 * | 2/2017 | Brankovic | B60N 2/002 |
| 2017/0330463 A1 * | 11/2017 | Li | B60K 37/04 |

FOREIGN PATENT DOCUMENTS

| | | |
|---|---|---|
| DE | 10 2005 039 895 A1 | 3/2007 |
| DE | 10 2006 027 326 A1 | 12/2007 |
| DE | 10 2008 020 007 A1 | 10/2008 |
| DE | 10 2009 034 105 A1 | 3/2010 |
| DE | 10 2010 033 729 A1 | 2/2012 |
| DE | 10 2013 018 753 A1 | 6/2014 |
| DE | 10 2013 104 256 A1 | 10/2014 |
| JP | 07108873 A | 4/1995 |
| WO | 2012/019691 A1 | 2/2012 |

OTHER PUBLICATIONS

International Search Report and Written Opinion of the International Searching Authority directed to related International Patent Application No. PCT/EP2016/000137, dated Feb. 4, 2015, with attached English-language translation; 25 pages.

International Preliminary Report on Patentability directed to related International Patent Application No. PCT/EP2016/000137, dated Aug. 17, 2017, with attached English-language translation; 17 pages.

* cited by examiner

METHOD FOR ACQUIRING TRANSVERSE-POSITION INFORMATION OF A MOTOR VEHICLE ON A CARRIAGEWAY AND MOTOR VEHICLE

The invention relates to a method for acquiring transverse-position information of a motor vehicle on a roadway, and a motor vehicle.

For motor vehicles, driver assistance systems are proposed which can provide support to a driver on multi-lane highways where the roadway is consequently divided into various traffic lanes. In this regard, the lane in which the driver's own motor vehicle is located is normally determined. In order to determine a lane assignment of this kind, the camera data of a camera directed at the area ahead of the motor vehicle are normally evaluated. The lines marked on the roadway can be detected by image processing, wherein dashed or broken lane markings can be distinguished from solid lane markings. Equally conceivable is a differentiation of roadway markings on the basis of their color—for example, whether the markings are yellow or white. All in all, this makes it possible, by evaluating multiple lane markings and the known relative position of the driver's own vehicle in relation to the lane markings, to determine the lane, e.g., left-hand, center, or right-hand lane, in which the driver's own vehicle is located.

The transverse-position information of the lane assignment makes it possible to make a better interpretation of certain driving maneuvers and/or critical driving situations. In this way, false or incorrect activations can be greatly reduced, and the quality of the driver assistance systems is improved. Examples of such driver assistance systems include lane-keeping systems (LDW, or Lane Departure Warning), lane-change assistants, and even driver assistance systems themselves carrying out lateral-guidance interventions.

Here, however, there emerges the problem that the performance of optical sensors—in particular, the camera mentioned—is greatly impaired by weather conditions and/or dirt on the lens. In the event of the field of view of the camera being restricted, the lane markings can thus be recognized only partially, or even not at all, and, consequently, false or incorrect warnings can occur. Another disadvantage of cameras is the strong decline in detection rates in low-light conditions—for example, in the dark.

Also problematic is that, on many roads, the lane markings can no longer be clearly distinguished—for example, because they have aged or been destroyed. Finally, there are also roads, e.g., in rural areas, where no lane markings are present at all. Many driver assistance systems based upon an optical detection of lane markings are severely impaired or no longer functional in situations where lane markings are not even present or are not clearly identifiable.

The invention is thus based upon the aim of finding an alternative way of acquiring the transverse-position information describing a lateral position of a motor vehicle on a roadway, which is independent of lane markings.

To achieve this aim, a method of the type mentioned above is envisaged by the invention, said method being characterized by at least part of the radar data describing the roadway being acquired by at least one radar sensor of the motor vehicle, environmental features describing the location of a roadway boundary being detected and localized in the radar data by evaluation, from these, a course of the roadway boundaries and lateral distances of the motor vehicle with respect to the roadway boundaries being determined, and the transverse-position information being determined as, or as a function of, the lateral distances of the motor vehicle in relation to the roadway boundaries.

The invention therefore proposes a way of obtaining transverse-position information which is exclusively based upon the evaluation of radar data as measurement data. With modern radar systems, which will be addressed in more detail later, the surroundings of the motor vehicle can be detected with a high degree of precision, so that it is therefore possible to identify in the radar data the roadway boundaries of the road currently being driven, wherein the environmental features describing the location of the roadway boundary are analyzed. In particular, it can be envisaged that a transition from the road surface to a different surface and/or guide rails and/or guide posts and/or a curbstone and/or a roadside structure and/or plants be detected as an environmental feature and localized. Due to the accuracy of the data from the radar sensor, it is possible in an evaluation to classify environmental features and thus to deduce whether, for example, an object is concerned which necessarily cannot be found on the roadway and which therefore must be an indication of the roadway boundary. Ideally, it is even possible—in particular, when highly accurate radar sensors based upon semiconductor technology are used—to detect even the transition from the road surface to another surface, thereby allowing the roadway boundary to be deduced directly. Ideally, the environmental features over a specific section of the roadway in the direction of travel and/or over a certain period of time are examined here, in order to obtain as precise a measure as possible for the location of the roadway boundaries. Once the location of the roadway boundaries in the vehicle coordinates system is known, from this, the lateral distance of the motor vehicle from the roadway boundaries follows directly—hence, the lateral distances. In summary, the detection and evaluation of radar data relating to the roadway and roadside objects or roadside features permits a conclusion to be drawn regarding the lateral distances of the motor vehicle from the left-hand and right-hand edges of the roadway. This is transverse-position information which is already useful and which can, for example, be used as a plausibility check on other results.

With the aid of the present invention, it is therefore possible to make a good estimate of the transverse position of a motor vehicle on the roadway using only a high-resolution radar system with at least one radar sensor, without the need to use image processing of camera data or related technologies. In this case, the radar sensor is not used in order to detect lane markings, but rather to extract the roadway boundary from the radar data, and, from this, to obtain the distances to the left-hand and right-hand roadway boundaries. For the sake of safety, it should be once again pointed out here that the relative position of the motor vehicle with respect to the environmental features under consideration, and thus to the roadway boundary, is already determined by the nature of the radar measurement, wherein, in particular, radar sensors are used which permit angular resolution on two mutually perpendicular planes. Evaluation of the radar data in this regard is widely known in the prior art.

A particularly advantageous embodiment of the present invention is obtained when several radar sensors—in particular, eight radar sensors—are used which cover the surroundings of the motor vehicle over a complete angular range of 360°. In this way, an extremely large database is obtained for determining the position of the roadway boundary, thus, in particular, making it possible to re-determine the transverse-position information afresh in every measurement cycle of the radar sensors, once data for a certain length of the roadway are in any case available. Before the described evaluation, the radar data from the various radar sensors can be combined into a high-resolution map of the surroundings, from which the environmental features can be extracted. An arrangement that has proved particularly advantageous uses eight radar sensors distributed around the motor vehicle, e.g., three radar sensors arranged in the front bumper, three radar sensors arranged in the rear bumper, and two radar sensors installed in the area of the doors—in particular, inside the doors.

As has already been indicated, one particularly advantageous embodiment envisages the at least one radar sensor being based upon a semiconductor technology, wherein, in particular, a radar sensor with a semiconductor chip—in particular, a CMOS chip—implementing the radar transceiver is used as the at least one radar sensor.

The implementation of radar components on the basis of semiconductors proved to be difficult for a long time, since expensive special semiconductors—in particular, GaAs—were required. Smaller radar sensors were proposed, the entire radar front-end of which is implemented on a single chip using SiGe technology, before solutions in CMOS technology also became known. Such solutions are the result of the expansion of the CMOS technology to high-frequency applications, which is also often referred to as RF-CMOS. Such a CMOS radar chip is implemented in an extremely compact design, does not use any expensive special semiconductors, and thus offers, first and foremost, significant advantages in manufacturing compared to other semiconductor technologies. An exemplary implementation of a 77 GHz radar transceiver as a CMOS chip is described in the article by Jri Lee et al., "A Fully Integrated 77-GHz FMCW Radar Transceiver in 65-nm CMOS Technology," IEEE Journal of Solid State Circuits 45 (2010), pp. 2746-2755.

Since it was additionally suggested that the chip and the antenna be implemented in a common package, an extremely cost-effective, small, radar sensor is possible, which can satisfy installation space requirements significantly better, has a very low signal-to-noise ratio due to the short signal paths, and is also suitable for high frequencies and wider, variable frequency bandwidths. For this reason, such compact-design radar sensors can also be used for short-range applications, such as in the range of 30 cm to 10 m.

It has also already been suggested that such a CMOS transceiver chip and/or a package with CMOS transceiver chip and antenna be provided on a common circuit board with a digital signal processor (DSP processor) or the function of the signal processor be integrated into the CMOS transceiver chip as well. A similar integration is possible for control functions.

It is therefore expedient also in the context of the present invention for a digital signal processor and/or a control unit of the radar sensor to be implemented by the semiconductor chip and/or the semiconductor chip and an antenna arrangement of the radar sensor to be implemented as a package.

The present invention thus exploits the availability of new radar technologies which permit high-resolution scanning of the surroundings of the motor vehicle even in areas of detection located closer to the motor vehicle. For example, radar sensors can thus be created which have a range of up to 50 m and nevertheless offer a high distance resolution—in particular, also in the near range. Extraction of environmental features, as described, is possible in excellent quality due to such high resolutions in the cm or even in the mm range. A major contribution of semiconductor technology here is also the fact that a low signal-to-noise ratio occurs on account of the short signal paths, and a suitability for high frequencies and larger, more variable frequency bandwidths results.

In this context, an advantageous embodiment of the present invention envisages the at least one radar sensor being operated with a frequency bandwidth of more than 1 GHz—in particular, 4 GHz—and/or in a frequency range of 77 to 81 GHz. A larger frequency bandwidth has the advantage that smaller distances can be resolved, thus contributing to the excellent resolution of the radar sensors, which are preferably realized in semiconductor technology.

In a particularly preferred embodiment of the invention, the transverse-position information for assigning the motor vehicle to a lane can be acquired by additionally taking into account at least one item of supplementary information describing at least the number of lanes on the roadway. If it is known, e.g., from the digital map data of a navigation system of the motor vehicle, how many lanes the road—that is, the roadway—currently being used has, the lane in which the motor vehicle is located can at least be estimated from relative position of the motor vehicle on the road known on the basis of the lateral distances. If the motor vehicle is, for example, driving rather centrally on a three-lane highway, it is to be assumed that it is in the middle lane. Beyond an estimate of this kind, a more accurate determination of the lane assignment can, however, also be made possible if more accurate (non-measured) supplementary information is available.

A useful further development in this context envisages roadway division information being derived from digital map data—in particular, the digital map data of a navigation system—and/or a country-specific lane width being taken into account as supplementary information. The digital map data from navigation systems, even today, include for every section of a highway the number of lanes, i.e., the number of the lanes present there which can be used within the scope of the present invention. Many proposals already exist for expanding digital map data of this kind, wherein one such conceivable extension particularly usefully concerns also such parts of the roadway as may be present, but are not used as traffic lanes. Such sections may, for example, be reserved for bicycles or represent a hard shoulder. Accordingly, the method is, in particular, further developed in that the road division information includes the number of lanes and/or sectional information describing the presence and/or the width and/or the position of a roadway section not used as a traffic lane.

When the number of lanes and, if applicable, sectional information are available, an extremely accurate lane assignment can be made by the method according to the invention, wherein it should be noted at the outset that the information so far obtained, i.e., the lateral distances, already enables determination of the roadway width, provided that, as is usually the case, the width of the motor vehicle is available in the motor vehicle; alternatively, the roadway width can, however, also be determined directly from the course of the roadway boundaries which has, of course, been detected. In other words, a roadway width can therefore be determined from the lateral distances and from a width of the motor vehicle stored in the motor vehicle and/or from the distance of the roadway boundaries. Now, it is particularly advantageously possible to assign intervals of the roadway width to traffic lanes at least partly on the basis of road division information, wherein lane assignment is effected over the roadway width on the basis of the position of the motor vehicle known from the lateral distances. Finally, a check is also carried out as to whether the transverse position of the motor vehicle permits the most accurate lane assignment possible, since the transverse position of the motor vehicle usually falls within at least one of the intervals. When the motor vehicle falls completely within an interval assigned to a lane, lane allocation is unambiguously possible; otherwise, a threshold value can, for example, be specified regarding the proportion of the motor vehicle which must fall within an interval assigned to a lane in order for the motor vehicle to be assigned to that lane. If the motor vehicle is, for example, in a transverse position such that equal proportions lie in two adjacent lanes, even an impossibility of lane allocation can be a return value, but it is preferable to determine transverse-position information as probability values for the motor vehicle falling within a particular lane, which can, for example, be based upon the proportion of the motor vehicle falling within the assigned interval. Various conceivable developments are apparent here.

This can be explained in more detail with the aid of an example. If lateral distances of 0.5 m on the left and 4.5 m on the right have, for example, been measured, and if the width of the motor vehicle is 2 m, this yields a roadway width of 7 m. If it is also known that two lanes are present, and the lane width is 3.5 m, as is typical for Germany, and that there is no section which is not being used for traffic lanes, then half of the roadway width will be assigned to each of the two lanes. From the aforementioned lateral distances, it can be deduced directly that the motor vehicle is located in the left-hand lane.

The robustness of this procedure can be increased even further if the measured lateral distances, the roadway widths derived from these, and the supplementary information are checked against each other for plausibility. An advantageous development in determining a roadway width from the lateral distances and the width of the motor vehicle stored in the motor vehicle, as well as from the distance of the roadway boundaries, accordingly envisages a plausibility check being conducted comparing the roadway widths determined from the radar data and/or a plausibility check of the number of lanes and/or the lane width as plausibility check values by obtaining comparison values from the roadway width, from the sectional information (if available), and from the other plausibility check value in each case. In this way, a check is ultimately carried out as to whether the supplementary information can actually constitute a description of the roadway as measured by the radar sensors.

One specific embodiment of the present invention may, for example, envisage a plausibility check being made, in a first step, to see whether the roadway width determined on the basis of the lateral distances has the same value as the roadway width derived from the roadway boundaries. A plausibility check can be made in a second step to see whether the measured roadway width divided by the number of lanes yields a plausible value for the typical lane width, as can be provided in the supplementary information. In a third step, a plausibility check can be carried out to see whether the number of lanes is correct, in that the measured roadway width (if applicable), as in the preceding second step, minus that part of the roadway not used as a traffic lane and then divided by the typical lane width provided in the supplementary information, yields the correct number of lanes as given in the supplementary information. If these three plausibility checks are passed, the lane assignment can be determined in a fourth step.

In determining a lane assignment as transverse-position information, a further improvement can be secured when, during determination of the lane assignment, at least one transversely offset motor vehicle detected in the radar data is taken into account. If the driver's own vehicle is, for example, being overtaken on the left according to the radar data and is itself overtaking motor vehicles on the right, it can be concluded that the motor vehicle must be in the center lane of three lanes, and the like. Information about other road users which can be derived from the radar data therefore represents a useful resource for improving the deduction of a lane assignment.

It can be envisaged that acquisition of the transverse-position information be restricted to at least one type of road—in particular, freeways. This can be useful when a lane assignment has to be made and a lane-width value as fixed as possible has to be taken into account, this being available in different countries for certain types of roads. Further types of road which are appropriate for application of the method according to the invention are highways with several lanes in one direction, multiple lanes in city traffic, and the like. Information as to the highway type can, for example, also be obtained from the digital map data in a navigation system.

The transverse-position information can, for example, be used for conducting a plausibility check for a lane assignment on the basis of the camera data of a camera and/or as a fallback level when selecting the camera. In particular, the motor vehicle thus has a driver assistance system in which the lane assignment is used for at least one function, e.g., in the context of a lane departure warning system or a lane-change assistant. As mentioned earlier, cameras are not always reliable, which means that the transverse-position information obtained from the radar data can be used for making a plausibility check of the lane assignment. Failure of the plausibility check means that restrictions can be applied to the scope of functions, depending upon the reliability of the corresponding data, or even transverse-position information from the radar data be used instead of transverse-position information from the camera data and/or for their correction. Should the camera fail, which also applies when it is discovered that its lens is dirty or the like, and also when the camera data can supply no information at all about the lanes—for example, because there are no lane markings—it is also conceivable to use the transverse-position information from the radar data—especially when this itself contains a lane assignment. The method according to the invention thus represents an excellent complement to the use of a camera.

In particular, in this context, assigning a confidence value to the transverse-position information may be envisaged, which is taken into account in the plausibility check and/or use as a fallback level. Here, the confidence value can be dependent upon incorrect values in determining lateral distances and/or the reliability values assigned to the supplementary information and/or the absence of supplementary information and/or the results of a plausibility check of measured values against supplementary information.

In addition to the method, the invention also relates to a motor vehicle having at least one radar sensor and one control device designed to implement the method according to the invention. All statements related to the method according to the invention can be analogously transferred to the motor vehicle according to the invention, with which the aforementioned advantages can likewise also be attained. In particular, the motor vehicle can also have at least one driver assistance system, which uses the transverse-position information acquired as part of the method according to the invention.

Figure 2:
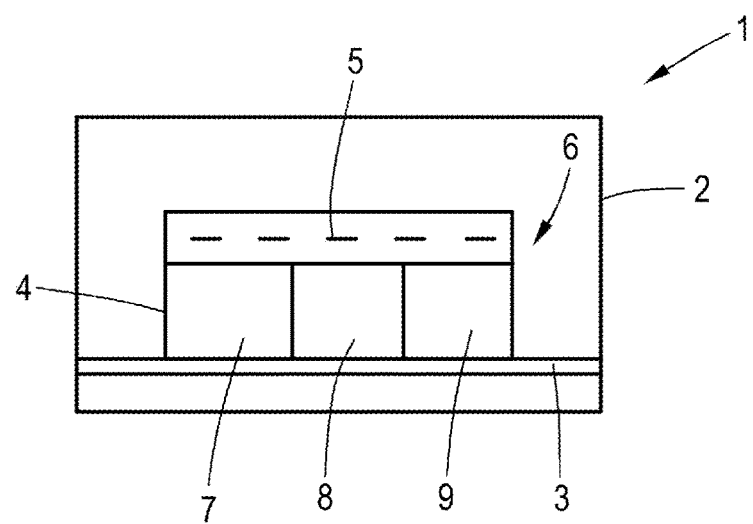
Figure 3:
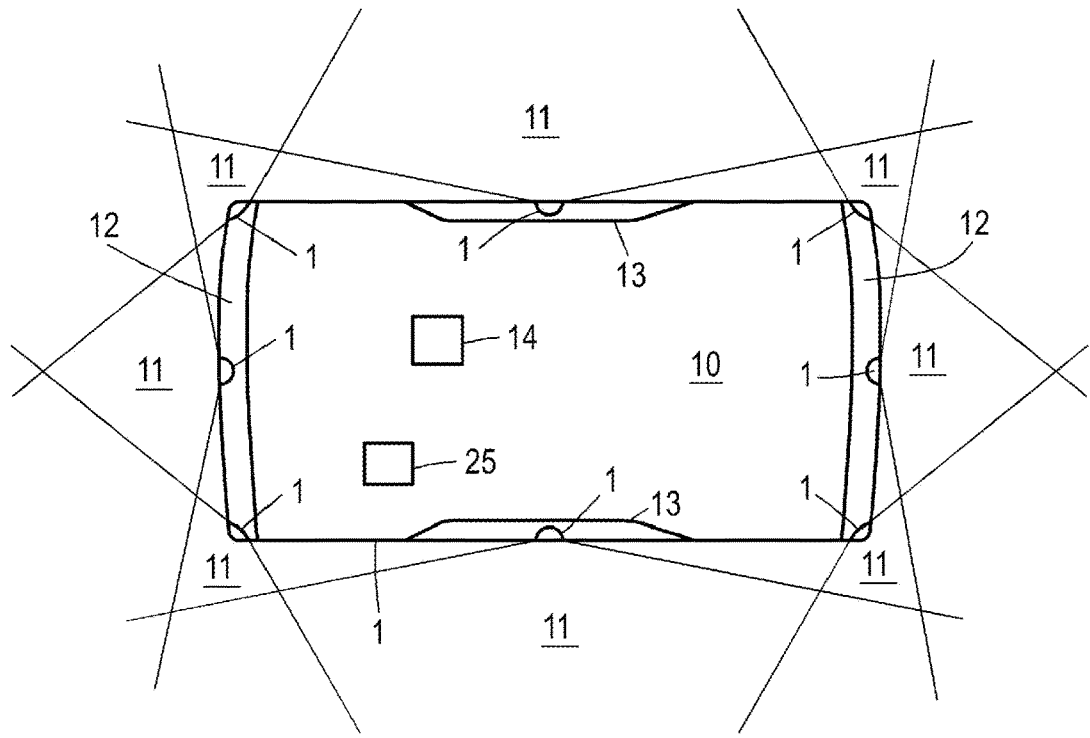
Figure 4:
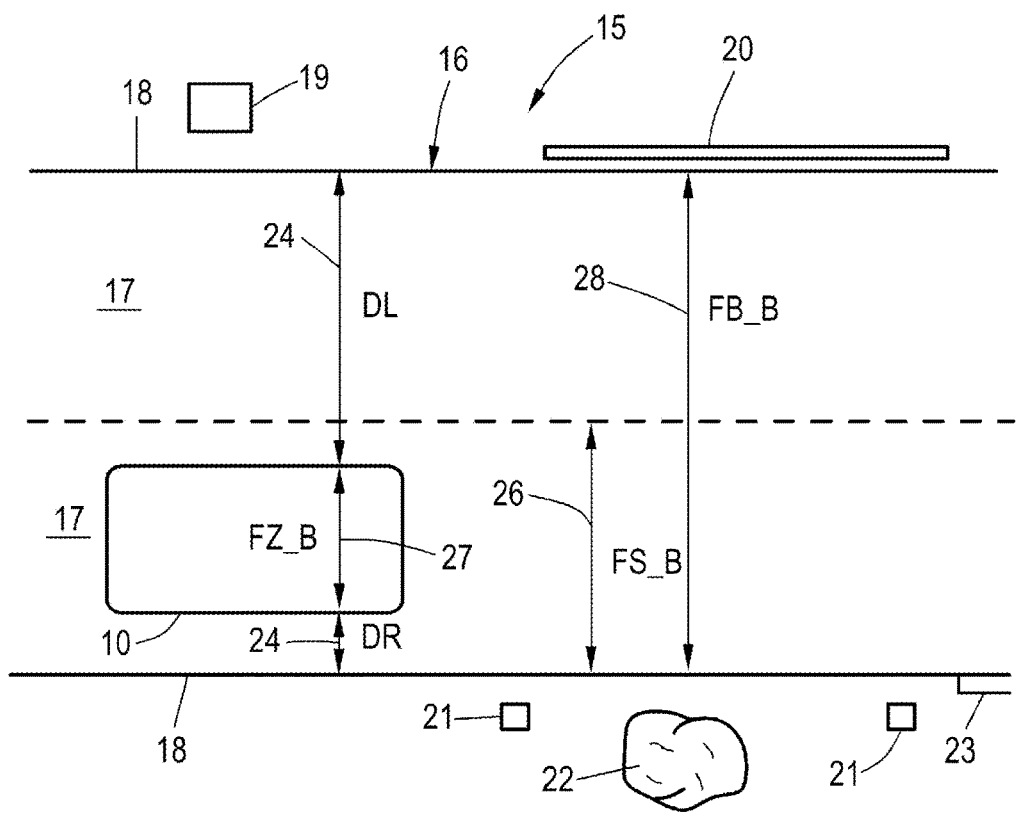

Further advantages and details of the present invention emerge from the embodiments described below and on the basis of the drawings. The following is shown:

FIG. 1 a flow chart of an exemplary embodiment of the method according to the invention, FIG. 2 a radar sensor as used here, FIG. 3 a motor vehicle according to the invention, and FIG. 4 the motor vehicle on a two-lane highway.

FIG. 1 shows a flow chart of an embodiment of the method according to the invention for acquiring transverse-position information of a motor vehicle on a roadway. Here, in a step S1, radar sensors of the motor vehicle are used which are directed at at least a part of the roadway and its surroundings. Radar sensors on a CMOS basis are used, wherein FIG. 2 shows one such radar sensor 1 as an example. This has a housing 2 in which a printed circuit board 3 is installed. A semiconductor chip 4—here, a CMOS chip—is arranged on the printed circuit board 3, which, together with an antenna arrangement 5 of the radar sensor 1, forms a package 6. Not only a radar transceiver 7, but also a digital signal processor 8 (DSP) and a control unit of the radar sensor 1 are implemented by the semiconductor chip 4. Such radar sensors 1 can have an extremely compact design and make possible high-resolution scanning of the surroundings of motor vehicle, even at shorter distances. High frequencies of the radar waves and also high frequency bandwidths can be achieved, which is additionally conducive to performance in high-resolution scanning of the environment. In the present case, the radar sensors 1 of the motor vehicle are operated with a frequency bandwidth of 4 GHz in the 77-81 GHz frequency range, which makes an outstanding distance resolution possible.

The radar sensors 1 can have a very compact design, e.g., a size of 3 cm×3 cm or smaller. They can accordingly be fitted so as to save space. The antenna arrangement 5 can usefully be designed to make possible an angular resolution in two directions, so that features surveyed by reflection can be assigned in their three-dimensional position in space. In addition, as appropriate for their purpose, the radar sensors 1 are wide-angle radar sensors.

Accordingly, FIG. 3 shows a schematic diagram of a motor vehicle 10 according to the invention in which a 360° scan of the surroundings of the motor vehicle 10 can be obtained when eight radar sensors 1 are used. To illustrate this, the detection zones 11 of the radar sensors 1, which are designed as wide-angle radar sensors, are shown. Areas of overlap can be used for mutual plausibility checking of the radar data.

Three of the radar sensors 1 are installed in each case in the front and rear bumpers 12 of the motor vehicle 10; the radar sensors 1 scanning the lateral environment are installed inside the doors 13. While bumpers 12 in any case usually consist of material permeable to radar radiation, it is conceivable for the doors 13 to be provided with the corresponding apertures in sheet-metal parts and covered with radar-permeable material, which is painted over to make the radar sensor 1 invisible externally. The radar data of the radar sensors 1 which are acquired in step S1 are routed to a control device 14 in the motor vehicle 10, which is designed to carry out the method according to the invention. For this purpose, in step S2, the radar data are combined to create a high-resolution map of the surroundings of the motor vehicle. This enables, in step S3, the extraction from the data of environmental features which show the position of the boundaries of the roadway on which the motor vehicle 10 is being operated.

By way of example, FIG. 4 shows a motor vehicle 10 on a highway 15—in this case, one direction of travel on a freeway whose roadway 16 has two traffic lanes 17. One important environmental feature which can be detected in the radar data that have a high enough resolution is the transition 18 from the roadway surface to a different surface, this transition offering the best indication of the course of the roadway boundary. However, there are also other environmental features which provide indications of the course or position of the roadway boundary, e.g., roadside structures 19, guide rails 20, guide posts 21, roadside plants 22 and, if applicable, curbstones 23.

Since all of these environmental features can be identified in the radar data and localized, a course of the roadway boundary can be deduced from them, which is carried out in step S4 in FIG. 1.

However, if the course of the roadway boundary relative to the motor vehicle 10 is first known, the lateral distances 24 of the motor vehicle 10 from the left-hand and right-hand roadway boundaries, marked as DL and DR in FIG. 4, can be derived directly. These lateral distances 24, as the first items of transverse-position information, are determined in step S5.

The method according to the invention is, however, not yet complete, since digital map data are available in a navigation system 25, indicated in FIG. 3, of the motor vehicle 10, from which data supplementary information is supplied for the further evaluation of the lateral distances 24. As supplementary information from the digital map data, roadway division information of the roadway 16 or highway 15 currently being driven is used which includes the number of lanes and section information, wherein the latter describes the presence, the width, and the location of any section of the roadway not being used as a traffic lane 17. To simplify the illustration, a roadway section of this kind is not shown in FIG. 4. A roadway section of this kind could, for example, be a bicycle lane or a hard shoulder.

A—in particular, country-specific—lane width 26, marked as FS_B in FIG. 4, is also available as further supplementary information, either stored in the digital map data or otherwise available. Finally, a width 27 of the driver's own motor vehicle 10, marked as FZ_B in FIG. 4, is also held in the motor vehicle 10. A roadway width 28, marked as FB_B in FIG. 4, can be calculated from the corresponding roadway division information.

This supplementary information, together with the lateral distances 24, is now used in steps S6 and S7 to determine further transverse-position information, wherein it should be noted at this point that embodiments of the present invention are also conceivable in which only the number of lanes is known, but a lane assignment can still be made, provided that the lateral distances 24 very clearly describe the transverse position of the motor vehicle 10 on the roadway 16, wherein such a lane assignment is further improved when the transversely offset motor vehicles detected in the radar data and thus travelling on different lanes 17 are additionally taken into consideration, wherein such a consideration of other road users can also be useful in the context of the specific embodiment described below.

Step S6 in FIG. 1 represents three plausibility check steps, wherein a plausibility check is first carried out to see whether the total acquired roadway width FB_B is equal to the sum of the other acquired variables DL, DR and the known vehicle width FZ_B, i.e., whether FB_B=DL+FZ_B+DR. It should be noted that FB_B can be primarily obtained as the distance of the detected roadway boundaries and be primarily determined by the radar data of the front or rear radar sensors 1. DL and DR are primarily measured by the lateral radar sensors 1, while FZ_B, as has already been described, is known for the driver's own motor vehicle 10.

In a second plausibility check step in step S6, a plausibility check can be carried out to see whether the lane width, FS_B, obtained by dividing the measured roadway width FB_B by the number of lanes, supplies a plausible value for the lane width FS_B, as provided in the motor vehicle, wherein supplementary information may of course also be taken into consideration, if applicable, by first deducting from the measured roadway width FB_B that part of the roadway not used for traffic lanes. In a third and final plausibility check step, a plausibility check can be carried out to see whether the number of lanes 17 is correct, since the number of lanes should be given by dividing the measured roadway width FB_B by the lane width FS_B held in the motor vehicle 10. If these plausibility checks (within a predefined tolerance) are successful, the process continues with step S7 (cf. FIG. 1).

Here, the lane assignment of the motor vehicle 10 can now be determined, for which intervals are determined in the roadway width FB_B which are assigned to specific traffic lanes 17. When the motor vehicle 10, described by the lateral distances DL and DR, falls mostly at least within such an interval, the lane assignment can be made.

Steps 6 and 7 should be explained again, but in more detail with the aid of a concrete example—in particular, with reference to FIG. 4. In this case, the following values were used: In this case, the following values were used: FB_B=7 m, DL=0.5 m, DR=4.5 m, FZ_B=2.0 m, number of lanes N=2, the country-specific lane width held in the motor vehicle 10 FS_B=3.5 m. In the first plausibility check sub-step of step S6, the calculated roadway width FB_B is 0.5 m+2.0 m+4.5 m, which clearly corresponds to the measured roadway width FB_B, so that the plausibility check is successful. In the second plausibility check sub-step, the calculated lane width FS_B is 7/2=3.5 m, which agrees with the typical lane width already known, which means that the plausibility check here too is successful. In the third plausibility check sub-step, the measured roadway width FB_B is divided by the given typical lane width, thus yielding 7 m/3.5 m=2, which corresponds to the number of lanes N supplied by the digital map data. This plausibility check is also successful.

Finally, in step S7, it is deduced from DL=0.5 m and DR=4.5 m that the motor vehicle must be located in the left-hand lane 17.

In the concluding step S8 (once again see FIG. 1), the transverse-position information obtained is now used in a driver assistance system in the motor vehicle 10—for example, to carry out a plausibility check on lane assignments obtained from camera data, and/or even to serve as a fallback level should camera-based lane assignment not be possible.

The invention claimed is:

1. A method for acquiring transverse-position information comprising a lane assignment of a motor vehicle on a roadway, the method comprising:
   acquiring, by a radar sensor of the motor vehicle, radar data comprising information of at least part of the roadway;
   detecting, by a control unit of the radar sensor, environmental features describing a location of a roadway boundary based on the radar data, wherein the environmental features comprise a transition from a road surface to another surface;
   evaluating, by the control unit of the radar sensor, the environmental features to localize in the radar data;
   determining, by the control unit of the radar sensor, a course of the roadway boundary and lateral distances of the motor vehicle with respect to the roadway boundary; and
   comparing, by the control unit of the radar sensor, the radar data with roadway division information derived from digital map data to perform a plausibility check for determination of a roadway width and the lane assignment of the motor vehicle;
   wherein the digital map data comprise section information describing at least one of a presence, a width, and a location of a part of the roadway not used as a traffic lane, and
   wherein a semiconductor chip comprises an implementation of the radar sensor and an implementation of a radar transceiver.

2. The method of claim 1, wherein the other surface comprises at least one of guide rails, guide posts, a curbstone, a roadside structure, or plants.

3. The method of claim 1, wherein the acquiring the radar data further comprises receiving radar data of surroundings of the motor vehicle over a complete angular range of 360°.

4. The method of claim 1, wherein the semiconductor chip is a complementary metal-oxide semiconductor (CMOS) chip.

5. The method of claim 1, wherein the semiconductor chip further comprises at least one of a digital signal processor, the control unit of the radar sensor, and an antenna arrangement of the radar sensor.

6. The method of claim 1, wherein the radar sensor is operating in a frequency range of 77 to 81 GHz.

7. The method of claim 1, further comprising receiving lane width data for determining the roadway width and the lane assignment of the motor vehicle.

8. The method of claim 7, wherein the roadway division information comprises a number of traffic lanes of the roadway.

9. The method of claim 8, further comprising:
   determining the roadway width based on the lateral distances of the motor vehicle and a width of the motor vehicle stored in the motor vehicle, or based on a distance from the roadway boundary.

10. The method of claim 1, further comprising detecting at least one transversely offset motor vehicle in the radar data for the lane assignment of the motor vehicle.

11. The method of claim 1, wherein the roadway comprises freeways.

12. The method of claim 1, further comprising comparing the lane assignment of the motor vehicle based on the radar data with a second lane assignment of the motor vehicle based on camera data of a camera.

13. A motor vehicle comprising:
   a radar sensor; and
   one control device configured to perform operations comprising:
     acquiring, by the radar sensor of the motor vehicle, radar data comprising information of at least part of a roadway;
     detecting, by a control unit of the radar sensor, environmental features describing a location of a roadway boundary based on the radar data, wherein the environmental features comprise a transition from a road surface to another surface;
     evaluating, by the control unit of the radar sensor, the environmental features to localize in the radar data;

determining, by the control unit of the radar sensor, a course of the roadway boundary and lateral distances of the motor vehicle with respect to the roadway boundary; and comparing, by the control unit of the radar sensor, the radar data with roadway division information derived from digital map data to perform a plausibility check for determination of a roadway width and a lane assignment of the motor vehicle;

wherein the digital map data comprise section information describing at least one of a presence, a width, and a location of a part of the roadway not used as a traffic lane, and wherein a semiconductor chip comprises an implementation of the radar sensor and an implementation of a radar transceiver.

\* \* \* \* \*